United States Patent
Wang

(10) Patent No.: US 10,594,853 B2
(45) Date of Patent: Mar. 17, 2020

(54) MOBILE SERVICE INFORMATION DISPLAY METHOD AND APPARATUS, MOBILE SERVICE INFORMATION SERVER AND SYSTEM, AND TERMINAL

(71) Applicant: Huawei Technologies Co., Ltd., Shenzhen (CN)

(72) Inventor: Jun Wang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/154,230

(22) Filed: Oct. 8, 2018

(65) Prior Publication Data
US 2019/0045047 A1 Feb. 7, 2019

Related U.S. Application Data

(63) Continuation of application No. 15/300,732, filed as application No. PCT/CN2014/074536 on Apr. 1, 2014, now Pat. No. 10,135,966.

(51) Int. Cl.
*H04W 4/029* (2018.01)
*H04M 1/725* (2006.01)
*H04L 29/08* (2006.01)

(52) U.S. Cl.
CPC ........ *H04M 1/72572* (2013.01); *H04L 67/22* (2013.01); *H04L 67/306* (2013.01); *H04L 67/36* (2013.01); *H04W 4/029* (2018.02)

(58) Field of Classification Search
CPC ... H04M 1/72572; H04W 4/028; H04W 8/18; H04W 4/02; H04L 67/306; H04L 67/36; H04L 67/22
See application file for complete search history.

(56) References Cited

U.S. PATENT DOCUMENTS

2002/0068585 A1   6/2002  Chan et al.
2002/0152122 A1*  10/2002 Chino ............. B60R 21/213
                                                705/14.64
2010/0223135 A1*  9/2010  Griffin ............. G06Q 30/02
                                                705/14.58
(Continued)

FOREIGN PATENT DOCUMENTS

CN   101370187 A   2/2009
CN   101499156 A   8/2009
(Continued)

OTHER PUBLICATIONS

"Location Architecture overview requirements", Candidate Version 1.0, XP64091390, Open Mobile Alliance, OMA-RD—LOC ArchOverview—V1_0-20041118-C.9 (Nov. 18, 2004).

*Primary Examiner* — Chuong A Ngo
(74) *Attorney, Agent, or Firm* — Leydig, Voit & Mayer, Ltd.

(57) ABSTRACT

A mobile service information display method, a mobile service information server and system are provided, which can avoid a waste of resources of the mobile service information system. The method includes: determining mobile service information according to obtained location information of a mobile terminal at a current moment and obtained location information of the mobile terminal within preset duration prior to the current moment; and sending the determined mobile service information to the mobile terminal for display.

20 Claims, 6 Drawing Sheets

---

Determine mobile service information according to obtained location information of a mobile terminal at a current moment and obtained location information of the mobile terminal within preset duration prior to the current moment — 101

Send the determined mobile service information to the mobile terminal for display — 102

(56) References Cited

U.S. PATENT DOCUMENTS

2011/0055014 A1    3/2011   Kim
2015/0186941 A1    7/2015   Anthony et al.

FOREIGN PATENT DOCUMENTS

| | | | |
|---|---|---|---|
| CN | 101835090 | A | 9/2010 |
| CN | 102006318 | A | 4/2011 |
| CN | 102819587 | A | 12/2012 |
| CN | 103235808 | A | 8/2013 |
| EP | 2224757 | A1 | 9/2010 |
| EP | 2339872 | A1 | 6/2011 |
| WO | 02099707 | A2 | 12/2002 |
| WO | 02099717 | A2 | 12/2002 |
| WO | 2013086028 | A1 | 6/2013 |
| WO | 2013127077 | A1 | 9/2013 |

\* cited by examiner

MOBILE SERVICE INFORMATION DISPLAY METHOD AND APPARATUS, MOBILE SERVICE INFORMATION SERVER AND SYSTEM, AND TERMINAL

CROSS-REFERENCE TO RELATED APPLICATIONS

This application is a divisional application of U.S. patent application Ser. No. 15/300,732, filed on Sep. 29, 2016, which is a National Stage of International Application No. PCT/CN2014/074536, filed on Apr. 1, 2014, both of which are hereby incorporated by reference in their entireties.

TECHNICAL FIELD

Embodiments of the present invention relate to the communications field, and in particular, to a mobile service information display method, a mobile service information display apparatus, a mobile service information server, a mobile terminal, and a mobile service information system.

BACKGROUND

Mobile service information is service information displayed when a mobile terminal (such as a mobile phone or a tablet computer) accesses a mobile application or a mobile web page, and forms of mobile service information include multiple forms such as a picture, a text, a video, and a link.

In the conventional art, when selecting mobile service information to be displayed on a mobile terminal, a mobile service information server generally performs selection only according to location information of the mobile terminal at a current moment. A correspondence between location information and mobile service information is stored on a side of the mobile service information server in advance. The mobile service information server searches the correspondence between location information and mobile service information according to the obtained location information of the mobile terminal at the current moment, to determine corresponding mobile service information, and sends the determined mobile service information to the mobile terminal for display.

However, in many cases, mobile service information that is to be displayed on a mobile terminal and determined by using the foregoing solution is not quite proper; therefore, processing resources of a mobile service information server and communication resources between the mobile service information server and the mobile terminal cannot be effectively used, which causes a waste of resources of a mobile service information system and also affects usage experience of a user.

SUMMARY

Embodiments of the present invention provide a mobile service information display method, a mobile service information display apparatus, a mobile service information server, a mobile terminal, and a mobile service information system, so as to avoid a waste of resources of the mobile service information system.

According to a first aspect, a mobile service information display method is provided, including:

determining mobile service information according to obtained location information of a mobile terminal at a current moment and obtained location information of the mobile terminal within preset duration prior to the current moment; and sending the determined mobile service information to the mobile terminal for display.

With reference to the first aspect, in a first possible implementation manner, the determining mobile service information according to obtained location information of a mobile terminal at a current moment and obtained location information of the mobile terminal within preset duration prior to the current moment includes:

determining, according to the obtained location information of the mobile terminal at the current moment and the obtained location information of the mobile terminal within the preset duration prior to the current moment, a user attribute currently corresponding to the mobile terminal; and determining, based on a preset correspondence between a user attribute and mobile service information, mobile service information corresponding to the user attribute currently corresponding to the mobile terminal.

With reference to the first possible implementation manner of the first aspect, in a second possible implementation manner, the determining, according to the obtained location information of the mobile terminal at the current moment and the obtained location information of the mobile terminal within the preset duration prior to the current moment, a user attribute currently corresponding to the mobile terminal comprises:

determining a location information characteristic possessed by the obtained location information of the mobile terminal at the current moment and the obtained location information of the mobile terminal within the preset duration prior to the current moment; and determining, according to a preset correspondence between a location information characteristic and a user attribute, that a user attribute corresponding to the possessed location information characteristic is the user attribute currently corresponding to the mobile terminal.

With reference to the first aspect, the first possible implementation manner of the first aspect, or the second possible implementation manner of the first aspect, in a third possible implementation manner, before the sending the determined mobile service information to the mobile terminal for display, the method further includes:

receiving a mobile service information obtaining request sent by the mobile terminal, where the mobile service information obtaining request carries a required amount of mobile service information; and the sending the determined mobile service information to the mobile terminal for display includes:

when an amount of the determined mobile service information exceeds the required amount of mobile service information, selecting mobile service information in the required amount of mobile service information from the determined mobile service information according to a preset rule, and sending the selected mobile service information to the mobile terminal for display.

With reference to the first aspect, the first possible implementation manner of the first aspect, the second possible implementation manner of the first aspect, or the third possible implementation manner of the first aspect, in a fourth possible implementation manner, location information of the mobile terminal is obtained in the following manners:

receiving location information of the mobile terminal reported by the mobile terminal in real time when a location of the mobile terminal changes; or receiving location information that is of the mobile terminal within a designated time period and reported by the mobile terminal when a preset condition is met, where the designated time period is a time period formed by a current moment and a moment at which the mobile terminal reports location information of the mobile terminal last time.

According to a second aspect, a mobile service information display apparatus is provided, including:

a determining unit, configured to determine mobile service information according to obtained location information of a mobile terminal at a current moment and obtained location information of the mobile terminal within preset duration prior to the current moment; and a sending unit, configured to send the determined mobile service information to the mobile terminal for display.

With reference to the second aspect, in a first possible implementation manner, the determining unit is configured to: determine, according to the obtained location information of the mobile terminal at the current moment and the obtained location information of the mobile terminal within the preset duration prior to the current moment, a user attribute currently corresponding to the mobile terminal, and determine, based on a preset correspondence between a user attribute and mobile service information, mobile service information corresponding to the user attribute currently corresponding to the mobile terminal.

With reference to the first possible implementation manner of the second aspect, in a second possible implementation manner, the determining unit is configured to: determine a location information characteristic possessed by the obtained location information of the mobile terminal at the current moment and the obtained location information of the mobile terminal within the preset duration prior to the current moment; and determine, according to a preset correspondence between a location information characteristic and a user attribute, that a user attribute corresponding to the possessed location information characteristic is the user attribute currently corresponding to the mobile terminal.

With reference to the second aspect, the first possible implementation manner of the second aspect, or the second possible implementation manner of the second aspect, in a third possible implementation manner, the apparatus further includes a first receiving unit, configured to: before the determined mobile service information is sent to the mobile terminal for display, receive a mobile service information obtaining request sent by the mobile terminal, where the mobile service information obtaining request carries a required amount of mobile service information; where the determining unit is configured to: when an amount of the determined mobile service information exceeds the required amount of mobile service information, select mobile service information in the required amount of mobile service information from the determined mobile service information according to a preset rule; and the sending unit is configured to send the selected mobile service information to the mobile terminal for display.

With reference to the second aspect, the first possible implementation manner of the second aspect, the second possible implementation manner of the second aspect, or the third possible implementation manner of the second aspect, in a fourth possible implementation manner, the apparatus further includes a second receiving unit, configured to: receive location information of the mobile terminal reported by the mobile terminal in real time when a location of the mobile terminal changes, or receive location information that is of the mobile terminal within a designated time period and reported by the mobile terminal when a preset condition is met, where the designated time period is a time period formed by a current moment and a moment at which the mobile terminal reports location information of the mobile terminal last time.

According to a third aspect, a mobile service information server is provided, including:

a processor, configured to determine mobile service information according to obtained location information of a mobile terminal at a current moment and obtained location information of the mobile terminal within preset duration prior to the current moment; and a transmitter, configured to send the determined mobile service information to the mobile terminal for display.

With reference to the third aspect, in a first possible implementation manner, the processor is configured to: determine, according to the obtained location information of the mobile terminal at the current moment and the obtained location information of the mobile terminal within the preset duration prior to the current moment, a user attribute currently corresponding to the mobile terminal, and determine, based on a preset correspondence between a user attribute and mobile service information, mobile service information corresponding to the user attribute currently corresponding to the mobile terminal.

With reference to the first possible implementation manner of the third aspect, in a second possible implementation manner, the processor is configured to: determine a location information characteristic possessed by the obtained location information of the mobile terminal at the current moment and the obtained location information of the mobile terminal within the preset duration prior to the current moment; and determine, according to a preset correspondence between a location information characteristic and a user attribute, that a user attribute corresponding to the possessed location information characteristic is the user attribute currently corresponding to the mobile terminal.

With reference to the third aspect, the first possible implementation manner of the third aspect, or the second possible implementation manner of the third aspect, in a third possible implementation manner, the server further includes a first receiver, configured to: before the determined mobile service information is sent to the mobile terminal for display, receive a mobile service information obtaining request sent by the mobile terminal, where the mobile service information obtaining request carries a required amount of mobile service information; where the processor is configured to: when an amount of the determined mobile service information exceeds the required amount of mobile service information, select mobile service information in the required amount of mobile service information from the determined mobile service information according to a preset rule; and the transmitter is configured to send the selected mobile service information to the mobile terminal for display.

With reference to the third aspect, the first possible implementation manner of the third aspect, the second possible implementation manner of the third aspect, or the third possible implementation manner of the third aspect, in a fourth possible implementation manner, the server further includes a second receiver, configured to: receive location information of the mobile terminal reported by the mobile terminal in real time when a location of the mobile terminal changes, or receive location information that is of the mobile terminal within a designated time period and reported by the mobile terminal when a preset condition is met, where the designated time period is a time period formed by a current moment and a moment at which the mobile terminal reports location information of the mobile terminal last time.

According to a fourth aspect, a mobile service information display method is provided, including:

reporting location information of a mobile terminal to a mobile service information server; and receiving and displaying mobile service information sent by the mobile service information server, where the mobile service information is determined by the mobile service information server according to location information of the mobile terminal at a current moment and location information of the mobile terminal within preset duration prior to the current moment.

With reference to the fourth aspect, in a first possible implementation manner, before the receiving mobile service information sent by the mobile service information server, the method further includes:

sending a mobile service information obtaining request to the mobile service information server, where the mobile service information obtaining request carries a required amount of mobile service information.

With reference to the fourth aspect or the first possible implementation manner of the fourth aspect, in a second possible implementation manner, the reporting location information of a mobile terminal to a mobile service information server is:

reporting location information of the mobile terminal to the mobile service information server in real time when a location of the mobile terminal changes; or reporting location information of the mobile terminal within a designated time period to the mobile service information server when a preset condition is met, where the designated time period is a time period formed by a current moment and a moment at which location information of the mobile terminal is reported last time.

According to a fifth aspect, a mobile service information display apparatus is provided, including:

a sending unit, configured to report location information of a mobile terminal to a mobile service information server; and a receiving unit, configured to: receive and display mobile service information sent by the mobile service information server, where the mobile service information is determined by the mobile service information server according to location information of the mobile terminal at a current moment and location information of the mobile terminal within preset duration prior to the current moment.

With reference to the fifth aspect, in a first possible implementation manner, the sending unit is further configured to: before the mobile service information sent by the mobile service information server is received, send a mobile service information obtaining request to the mobile service information server, where the mobile service information obtaining request carries a required amount of mobile service information.

With reference to the fifth aspect or the first possible implementation manner of the fifth aspect, in a second possible implementation manner, the sending unit is configured to: report location information of the mobile terminal to the mobile service information server in real time when a location of the mobile terminal changes, or report location information of the mobile terminal within a designated time period to the mobile service information server when a preset condition is met, where the designated time period is a time period formed by a current moment and a moment at which location information of the mobile terminal is reported last time.

According to a sixth aspect, a mobile terminal is provided, including:

a transmitter, configured to report location information of the mobile terminal to a mobile service information server; and a receiver, configured to: receive and display mobile service information sent by the mobile service information server, where the mobile service information is determined by the mobile service information server according to location information of the mobile terminal at a current moment and location information of the mobile terminal within preset duration prior to the current moment.

With reference to the sixth aspect, in a first possible implementation manner, the transmitter is further configured to: before the mobile service information sent by the mobile service information server is received, send a mobile service information obtaining request to the mobile service information server, where the mobile service information obtaining request carries a required amount of mobile service information.

With reference to the sixth aspect or the first possible implementation manner of the sixth aspect, in a second possible implementation manner, the transmitter is configured to: report location information of the mobile terminal to the mobile service information server in real time when a location of the mobile terminal changes, or report location information of the mobile terminal within a designated time period to the mobile service information server when a preset condition is met, where the designated time period is a time period formed by a current moment and a moment at which location information of the mobile terminal is reported last time.

According to a seventh aspect, a mobile service information system is provided, including a mobile terminal and a mobile service information server; where the mobile terminal is configured to: report location information of the mobile terminal to the mobile service information server, and receive and display mobile service information sent by the mobile service information server; and the mobile service information server is configured to: receive the location information reported by the mobile terminal, determine mobile service information according to location information of the mobile terminal at a current moment and location information of the mobile terminal within preset duration prior to the current moment, and send the determined mobile service information to the mobile terminal.

With reference to the seventh aspect, in a first possible implementation manner, the mobile service information server is configured to: determine, according to the location information of the mobile terminal at the current moment and the location information of the mobile terminal within the preset duration prior to the current moment, a user attribute currently corresponding to the mobile terminal, and determine, based on a preset correspondence between a user attribute and mobile service information, mobile service information corresponding to the user attribute currently corresponding to the mobile terminal.

With reference to the first possible implementation manner of the seventh aspect, in a second possible implementation manner, the mobile service information server is configured to: determine a location information characteristic possessed by the obtained location information of the mobile terminal at the current moment and the obtained location information of the mobile terminal within the preset duration prior to the current moment; and determine, according to a preset correspondence between a location information characteristic and a user attribute, that a user attribute corresponding to the possessed location information characteristic is the user attribute currently corresponding to the mobile terminal.

With reference to the seventh aspect, the first possible implementation manner of the seventh aspect, or the second possible implementation manner of the seventh aspect, in a third possible implementation manner, the mobile terminal is further configured to: before receiving the mobile service information sent by the mobile service information server, send a mobile service information obtaining request to the mobile service information server, where the mobile service information obtaining request carries a required amount of mobile service information; and the mobile service information server is further configured to: before sending the determined mobile service information to the mobile terminal for display, receive the mobile service information obtaining request sent by the mobile terminal; when an amount of the determined mobile service information exceeds the required amount of mobile service information, select mobile service information in the required amount of mobile service information from the determined mobile service information according to a preset rule; and send the selected mobile service information to the mobile terminal for display.

With reference to the seventh aspect, the first possible implementation manner of the seventh aspect, the second possible implementation manner of the seventh aspect, or the third possible implementation manner of the seventh aspect, in a fourth possible implementation manner, the mobile terminal is configured to report location information of the mobile terminal to the mobile service information server in real time when a location of the mobile terminal changes, and the mobile service information server is configured to receive the location information reported by the mobile terminal in real time; or the mobile terminal is configured to report location information of the mobile terminal within a designated time period to the mobile service information server when a preset condition is met, and the mobile service information server is configured to receive the location information that is within the designated time period and reported by the mobile terminal, where the designated time period is a time period formed by a current moment and a moment at which the mobile terminal reports location information of the mobile terminal last time.

According to the mobile service information display method provided in the first aspect, the mobile service information display apparatus provided in the second aspect, the mobile service information server provided in the third aspect, the mobile service information display method provided in the fourth aspect, the mobile service information display apparatus provided in the fifth aspect, the mobile terminal provided in the sixth aspect, and the mobile service information system provided in the seventh aspect, mobile service information to be displayed on the mobile terminal is determined according to location information of the mobile terminal at a current moment and location information of the mobile terminal within preset duration prior to the current moment. Compared with an existing technical solution in which mobile service information to be displayed on a mobile terminal is determined only according to location information of the mobile terminal at a current moment, the information according to which the mobile service information is determined is more comprehensive. Therefore, properness of the determined mobile service information can be improved, so that processing resources of the mobile service information server and communication resources between the mobile service information server and the mobile terminal can be effectively used. Thus, a waste of resources of the mobile service information system can be avoided, and usage experience of a user can be improved.

BRIEF DESCRIPTION OF DRAWINGS

Accompanying drawings are used for providing a further understanding of the present invention, constitute a part of the specification, and are used to explain the present invention together with embodiments of the present invention, but do not constitute a limitation on the present invention. In the accompanying drawings.

DESCRIPTION OF EMBODIMENTS

To provide a mobile service information display solution that can avoid a waste of resources of a mobile service information system, embodiments of the present invention provide a mobile service information display method, a mobile service information display apparatus, a mobile service information server, a mobile terminal, and a mobile service information system. The following describes exemplary embodiments of the present invention with reference to the accompanying drawings of this specification. It should be understood that the exemplary embodiments described herein are merely used to describe and explain the present invention, but are not intended to limit the present invention. In addition, the embodiments of the present application and features in the embodiments may be mutually combined if they do not conflict with each other.

Figure 1:
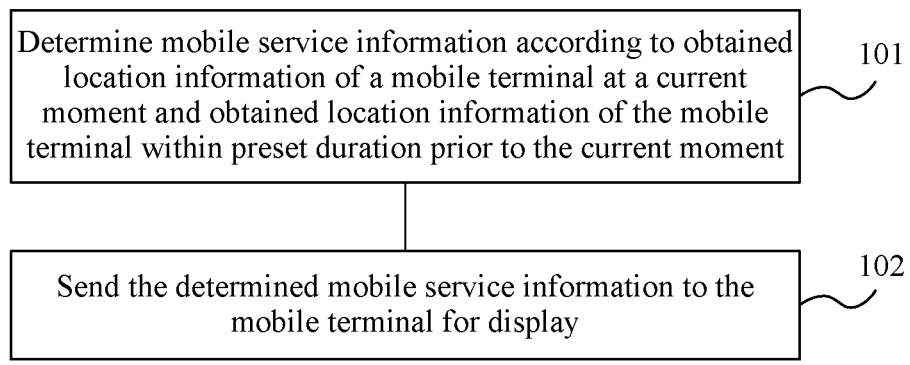
FIG. 1 is flowchart 1 of a mobile service information display method according to an embodiment of the present invention.

An embodiment of the present invention provides a mobile service information display method. As shown in FIG. 1, the method includes the following steps:

Step 101: Determine mobile service information according to obtained location information of a mobile terminal at a current moment and obtained location information of the mobile terminal within preset duration prior to the current moment.

Step 102: Send the determined mobile service information to the mobile terminal for display.

The mobile service information display method shown in FIG. 1 may be executed by a mobile service information server.

Location information of the mobile terminal may be obtained in multiple manners. Examples are as follows:

In manner 1, the mobile terminal reports location information of the mobile terminal in real time when a location of the mobile terminal changes, that is, obtaining of the location information is implemented by receiving the location information of the mobile terminal reported by the mobile terminal in real time when the location of the mobile terminal changes.

That is, in manner 1, the mobile terminal reports the location information in real time, and the location information may not be locally stored on the mobile terminal.

In manner 2, the mobile terminal reports location information that is of the mobile terminal and within a designated time period when a preset condition is met, that is, obtaining of the location information is implemented by receiving the location information that is of the mobile terminal within the designated time period and reported by the mobile terminal when the preset condition is met, where the designated time period is a time period formed by a current moment and a moment at which the mobile terminal reports location information of the mobile terminal last time.

The foregoing preset condition may be that the mobile terminal accesses a WiFi network, that is, when accessing the WiFi network, the mobile terminal reports the location information that is of the mobile terminal and within the designated time period, which can reduce data traffic of the mobile terminal and reduce tariff overheads. Alternatively, the foregoing preset condition may be that a current moment arrives at a moment at which the mobile terminal reports the location information of the mobile terminal according to a preset period, that is, when the current moment arrives at the moment at which the mobile terminal reports the location information of the mobile terminal according to the preset period, the mobile terminal reports the location information that is of the mobile terminal and within the designated time period, that is, periodically reports the location information of the mobile terminal, which can avoid frequent information reporting of the mobile terminal. It may be learned that the preset condition may be set according to a user requirement, and setting of the foregoing preset conditions is merely exemplary, but is not used to limit the present invention.

That is, in manner 2, the mobile terminal does not report the location information in real time, but needs to locally store the location information that is within the designated time period on the mobile terminal, and may delete the location information after reporting the location information.

Further, step 101 may include:

determining, according to the obtained location information of the mobile terminal at the current moment and the obtained location information of the mobile terminal within the preset duration prior to the current moment, a user attribute currently corresponding to the mobile terminal, and determining, based on a preset correspondence between a user attribute and mobile service information, mobile service information corresponding to the user attribute currently corresponding to the mobile terminal.

The user attribute currently corresponding to the mobile terminal is a current attribute of a user corresponding to the mobile terminal, that is, a current attribute of a user that uses the mobile terminal.

In an embodiment of the present invention, the determined mobile service information may be actively pushed to the mobile terminal, that is, without a need to receive a mobile service information obtaining request sent by the mobile terminal, the determined mobile service information is sent to the mobile terminal for display. Alternatively, in another embodiment of the present invention, after a mobile service information obtaining request sent by the mobile terminal is received, the determined mobile service information is sent to the mobile terminal for display.

Figure 2:
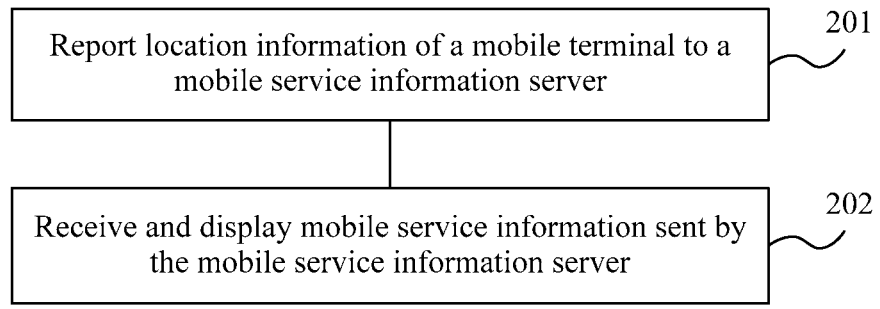
FIG. 2 is flowchart 2 of a mobile service information display method according to an embodiment of the present invention.

That is, correspondingly, an embodiment of the present invention provides a mobile service information display method. As shown in FIG. 2, the method includes the following steps:

Step 201: Report location information of a mobile terminal to a mobile service information server.

Step 202: Receive and display mobile service information sent by the mobile service information server, where the mobile service information is determined by the mobile service information server according to location information of the mobile terminal at a current moment and location information of the mobile terminal within preset duration prior to the current moment.

The mobile service information display method shown in FIG. 2 may be executed by the mobile terminal.

Step 201 that report location information of a mobile terminal to a mobile service information server may be reporting location information of the mobile terminal to the mobile service information server in real time when a location of the mobile terminal changes, or reporting location information of the mobile terminal within a designated time period to the mobile service information server when a preset condition is met, where the designated time period is a time period formed by a current moment and a moment at which location information of the mobile terminal is reported last time.

Further, before the mobile service information sent by the mobile service information server is received, the method may further include: sending a mobile service information obtaining request to the mobile service information server.

With reference to accompanying drawings, by using specific embodiments, the following provides a detailed description of the mobile service information display solution provided in the embodiments of the present invention.

Embodiment 1

Figure 3:
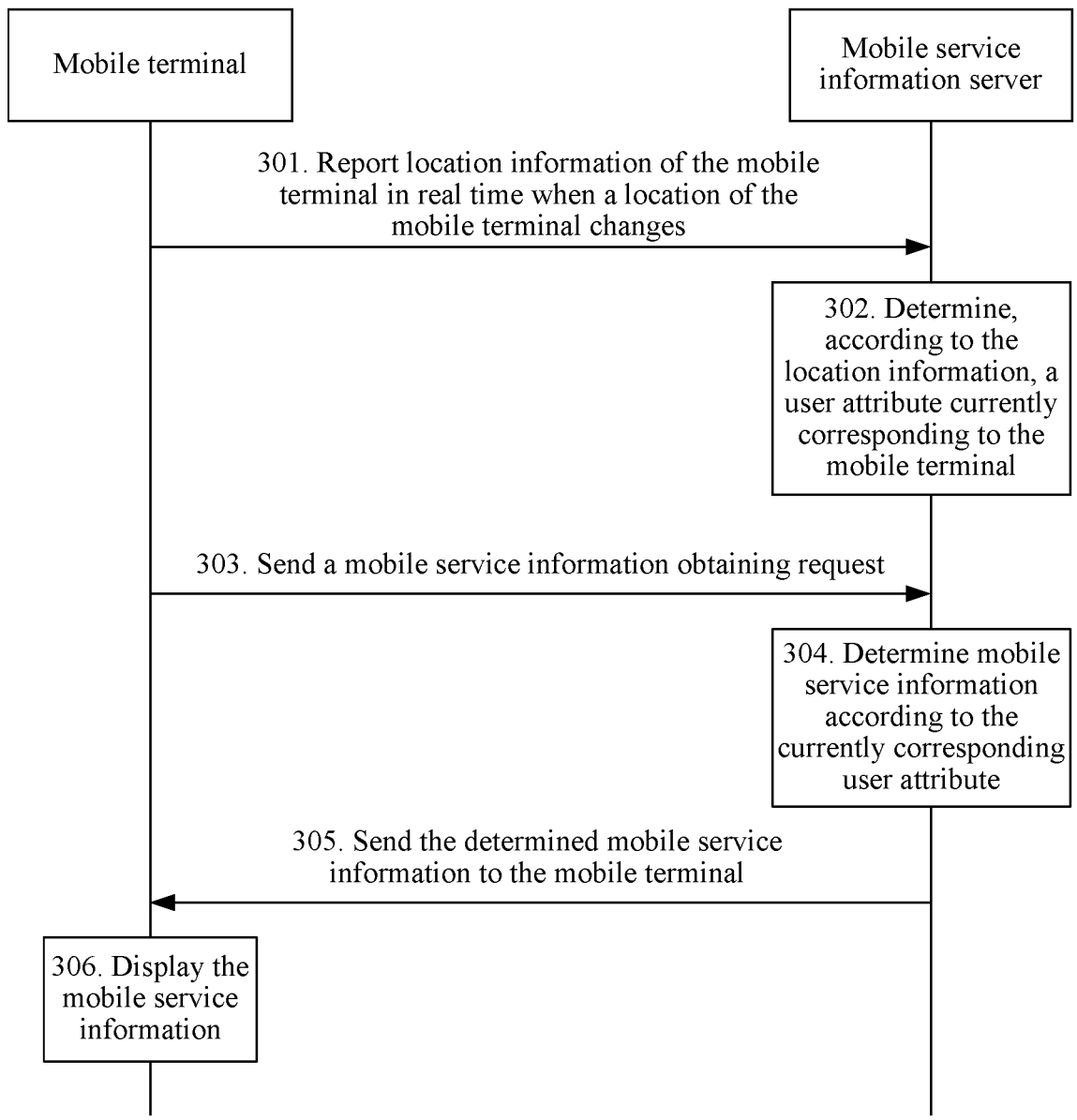
FIG. 3 is a detailed flowchart of a mobile service information display method according to Embodiment 1 of the present invention.

FIG. 3 shows a flowchart of a mobile service information display method according to Embodiment 1 of the present invention. The method includes the following steps:

Step 301: A mobile terminal reports location information of the mobile terminal to a mobile service information server in real time when a location of the mobile terminal changes.

Step 302: The mobile service information server receives the location information reported by the mobile terminal, and determines, according to location information of the mobile terminal at a current moment and location information of the mobile terminal within preset duration prior to the current moment, a user attribute currently corresponding to the mobile terminal.

A length of the preset duration may be set by a user. Generally, a longer preset duration indicates more data samples for analysis, which achieves higher accuracy of the determined user attribute.

During specific implementation, the user may preset a correspondence between a location information characteristic and a user attribute. For determining the user attribute currently corresponding to the mobile terminal, a location information characteristic possessed by location information of the mobile terminal (including the location information of the mobile terminal at the current moment and the location information of the mobile terminal within the preset duration prior to the current moment) is first determined, the preset correspondence between a location information characteristic and a user attribute is queried, and a user attribute corresponding to the location information characteristic possessed by the location information of the mobile terminal is the user attribute currently corresponding to the mobile terminal.

There may be one or more user attributes currently corresponding to the mobile terminal.

The preset correspondence between a location information characteristic and a user attribute may be a one-to-one correspondence, which is shown in the following table:

| Location information characteristic | User attribute |
|---|---|
| Location information characteristic 1 | User attribute 1 |
| Location information characteristic 2 | User attribute 2 |
| Location information characteristic 3 | User attribute 3 |
| Location information characteristic 4 | User attribute 4 |
| . | . |
| . | . |
| . | . |

In this case, if the location information of the mobile terminal possesses only one location information characteristic, the mobile terminal is corresponding to one user attribute; if the location information of the mobile terminal possesses multiple location information characteristics, the mobile terminal is corresponding to multiple user attributes.

Alternatively, the preset correspondence between a location information characteristic and a user attribute may not be a one-to-one correspondence, which is shown in the following table:

| Location information characteristic | User attribute |
|---|---|
| Location information characteristic 1 | User attribute 1 |
| Location information characteristic 2 | User attribute 2 |
|  | User attribute 3 |
| Location information characteristic 3 | User attribute 4 |
| Location information characteristic 4 | User attribute 4 |
| . | . |
| . | . |
| . | . |

In this case, regardless of whether the location information of the mobile terminal possesses only one location information characteristic or multiple location information characteristics, the mobile terminal may be corresponding to only one user attribute, or corresponding to multiple user attributes.

During specific implementation, the user may also prescribe a limit that a quantity of finally determined user attributes currently corresponding to the mobile terminal does not exceed a designated quantity. When multiple user attributes currently corresponding to the mobile terminal are determined according to the preset correspondence between a location information characteristic and a user attribute and a quantity of the user attributes exceeds the designated quantity, user attributes in the designated quantity may be selected from the multiple user attributes at random, or user attributes in the designated quantity may be selected according to a preset rule.

Step 303: The mobile terminal sends a mobile service information obtaining request to the mobile service information server.

The mobile service information obtaining request may be triggered by the mobile terminal when the mobile terminal accesses a mobile application or a mobile web page.

Step 304: The mobile service information server receives the mobile service information obtaining request sent by the mobile terminal, and determines mobile service information according to the user attribute currently corresponding to the mobile terminal.

A correspondence between a user attribute and mobile service information may be locally stored on the mobile service information server in advance. When the mobile service information obtaining request sent by the mobile terminal is received, the correspondence between a user attribute and mobile service information is queried to determine the mobile service information corresponding to the user attribute currently corresponding to the mobile terminal.

Further, when the mobile service information obtaining request that is sent by the mobile terminal and received by the mobile service information server carries a required amount of mobile service information, an amount of mobile service information finally determined in step 304 may be determined according to the required amount of mobile service information. The required amount of mobile service information represents a mobile service information display requirement of the mobile terminal.

That is, there may be one or more pieces of mobile service information determined in step 304.

The preset correspondence between a user attribute and mobile service information may be a one-to-one correspondence, which is shown in the following table:

| User attribute | Mobile service information |
|---|---|
| User attribute 1 | Mobile service information 1 |
| User attribute 2 | Mobile service information 2 |
| User attribute 3 | Mobile service information 3 |
| User attribute 4 | Mobile service information 4 |
| . | . |
| . | . |
| . | . |

Alternatively, the preset correspondence between a user attribute and mobile service information may not be a one-to-one correspondence, which is shown in the following table:

| User attribute | Mobile service information |
|---|---|
| User attribute 1 | Mobile service information 1 |
| User attribute 2 | Mobile service information 2 |
|  | Mobile service information 3 |
| User attribute 3 | Mobile service information 4 |
| User attribute 4 | Mobile service information 4 |
| . | . |
| . | . |
| . | . |

When multiple pieces of mobile service information are corresponding to the user attribute currently corresponding to the mobile terminal and an amount of the user attributes exceeds the required amount of mobile service information, mobile service information in the required amount of mobile service information may be selected from the multiple pieces of mobile service information at random, or mobile service information in the required amount of mobile service information may be selected according to a preset rule, and the selected mobile service information is used as the mobile service information finally determined in this step. For example, if priorities are set for the multiple pieces of mobile service information, mobile service information with a high priority may be selected.

Alternatively, when a relatively small amount of mobile service information is corresponding to the user attribute currently corresponding to the mobile terminal and does not reach the required amount of mobile service information, mobile service information may be selected from all mobile service information at random, or mobile service information is selected according to a preset rule, so as to make a supplement to the amount and meet the mobile service information display requirement.

Step 305: The mobile service information server sends the determined mobile service information to the mobile terminal.

Step 306: The mobile terminal receives and displays the mobile service information sent by the mobile service information server.

It may be learned that compared with the conventional art, information according to which mobile service information is determined is more comprehensive in the mobile service information display method provided in Embodiment 1 of the present invention; therefore, the determined mobile service information can be more proper, which avoids a waste of resources of a mobile service information system, and improves using experience of a user.

The following uses a mobile advertisement as an example to illustrate the mobile service information display method provided in the embodiments of the present invention.

Embodiment 2

Figure 4:
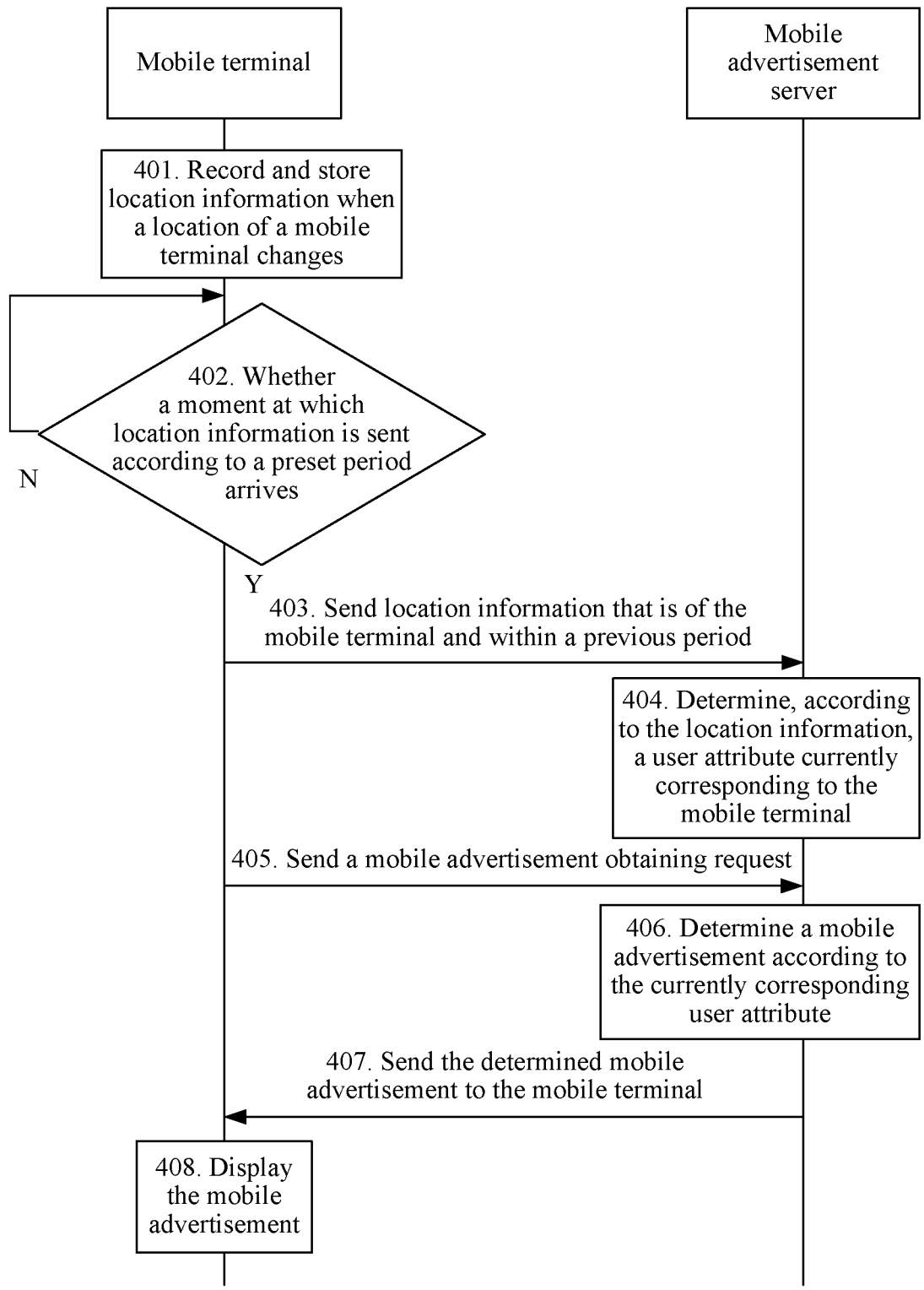
FIG. 4 is a detailed flowchart of a mobile advertisement display method according to Embodiment 2 of the present invention.

FIG. 4 shows a flowchart of a mobile advertisement display method according to Embodiment 2 of the present invention. The method includes the following steps:

Step 401: A mobile terminal locally records and stores location information when a location of the mobile terminal changes.

Step 402: The mobile terminal determines whether a current moment arrives at a moment at which the location information is sent according to a preset period.

When it is determined that the current moment arrives at the moment at which the mobile terminal sends the location information according to the preset period, step 403 is to be performed; when it is determined that the current moment does not arrive at the moment at which the mobile terminal sends the location information according to the preset period, step 402 is to be repeatedly performed to perform repeated determining.

Step 403: The mobile terminal sends location information of the mobile terminal within a previous period to a mobile advertisement server.

After the sending, the location information of the mobile terminal within the previous period may be locally deleted.

Step 404: The mobile advertisement server receives the location information reported by the mobile terminal, and determines, according to location information of the mobile terminal at a current moment and location information of the mobile terminal within preset duration prior to the current moment, a user attribute currently corresponding to the mobile terminal.

That is, the mobile advertisement server performs a data analysis of the location information. For example, when the location information of the mobile terminal at the current moment is "Beijing", and the location information of the mobile terminal within the preset duration prior to the current moment is "Hebei", it is likely that a user that uses the mobile terminal is on a business trip or a visit to Beijing, and in this case, it may be determined that the user attribute currently corresponding to the mobile terminal is "business trip/travel".

A correspondence between location information and an attribute may be freely set by a user, and examples are not given herein again.

Step 405: The mobile terminal sends a mobile advertisement obtaining request to the mobile advertisement server.

The mobile advertisement obtaining request may be triggered by the mobile terminal when the mobile terminal accesses a mobile application or a mobile web page.

Step 406: The mobile advertisement server receives the mobile advertisement obtaining request sent by the mobile terminal, and determines a mobile advertisement according to the user attribute currently corresponding to the mobile terminal.

A correspondence between a user attribute and a mobile advertisement may be locally stored on the mobile advertisement server in advance. When the mobile advertisement obtaining request sent by the mobile terminal is received, the correspondence between a user attribute and a mobile advertisement is queried to determine the mobile advertisement corresponding to the user attribute currently corresponding to the mobile terminal.

Assuming that a mobile advertisement corresponding to a user attribute "business trip/travel" in the correspondence between a user attribute and a mobile advertisement is "air ticket booking", that is, the user attribute that is currently corresponding to the mobile terminal and determined in the example in step 402 is "business trip/travel", the mobile advertisement determined in step 404 is "air ticket booking".

Step 407: The mobile advertisement server sends the determined mobile advertisement to the mobile terminal.

Step 408: The mobile terminal receives and displays the mobile advertisement sent by the mobile advertisement server.

It may be learned that by using the mobile advertisement display method provided in Embodiment 2 of the present invention, location information of a mobile terminal at a current moment and location information of the mobile terminal within preset duration prior to the current moment are analyzed; therefore, a determined mobile advertisement is more proper, which can avoid a waste of resources of a mobile advertisement system.

Embodiment 3

Figure 5:
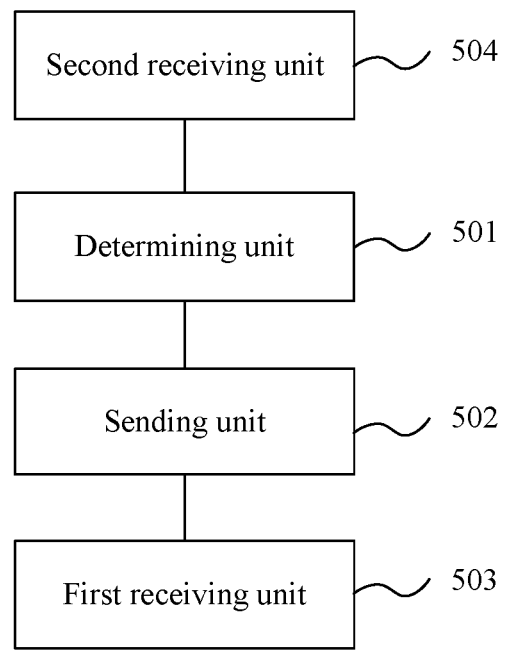
FIG. 5 is a schematic diagram of a structure of a mobile service information display apparatus according to Embodiment 3 of the present invention.

Based on a same inventive concept, according to the mobile service information display method provided in the foregoing embodiment of the present invention, correspondingly, this embodiment of the present invention further provides a mobile service information display apparatus, and a schematic diagram of a structure of the apparatus is shown in FIG. 5. The apparatus includes:

a determining unit 501, configured to determine mobile service information according to obtained location information of a mobile terminal at a current moment and obtained location information of the mobile terminal within preset duration prior to the current moment; and a sending unit 502, configured to send the determined mobile service information to the mobile terminal for display.

Further, the determining unit 501 is configured to: determine, according to the obtained location information of the mobile terminal at the current moment and the obtained location information of the mobile terminal within the preset duration prior to the current moment, a user attribute currently corresponding to the mobile terminal, and determine, based on a preset correspondence between a user attribute and mobile service information, mobile service information corresponding to the user attribute currently corresponding to the mobile terminal.

Further, the determining unit 501 is configured to: determine a location information characteristic possessed by the obtained location information of the mobile terminal at the current moment and the obtained location information of the mobile terminal within the preset duration prior to the current moment; and determine, according to a preset correspondence between a location information characteristic and a user attribute, that a user attribute corresponding to the possessed location information characteristic is the user attribute currently corresponding to the mobile terminal.

Further, the apparatus further includes a first receiving unit 503, configured to: before the determined mobile service information is sent to the mobile terminal for display, receive a mobile service information obtaining request sent by the mobile terminal, where the mobile service information obtaining request carries a required amount of mobile service information.

The determining unit 501 is configured to: when an amount of the determined mobile service information exceeds the required amount of mobile service information, select mobile service information in the required amount of mobile service information from the determined mobile service information according to a preset rule.

The sending unit 502 is configured to send the selected mobile service information to the mobile terminal for display.

Further, the apparatus further includes a second receiving unit 504, configured to: receive location information of the mobile terminal reported by the mobile terminal in real time when a location of the mobile terminal changes, or receive location information that is of the mobile terminal within a designated time period and reported by the mobile terminal when a preset condition is met, where the designated time period is a time period formed by a current moment and a moment at which the mobile terminal reports location information of the mobile terminal last time.

Functions of the foregoing units may be corresponding to corresponding processing steps in a process shown in any one of FIG. 1, FIG. 3, and FIG. 4, and details are not described herein again.

Alternatively, in another embodiment of the present invention, the foregoing first receiving unit 503 and second receiving unit 504 may be one receiving unit.

Embodiment 4

Figure 6:
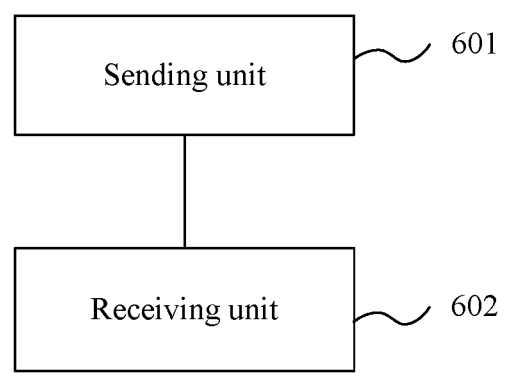
FIG. 6 is a schematic diagram of a structure of a mobile service information display apparatus according to Embodiment 4 of the present invention.

Based on a same inventive concept, according to the mobile service information display method provided in the foregoing embodiment of the present invention, correspondingly, this embodiment of the present invention further provides a mobile service information display apparatus, and a schematic diagram of a structure of the apparatus is shown in FIG. 6. The apparatus includes:

a sending unit 601, configured to report location information of a mobile terminal to a mobile service information server; and a receiving unit 602, configured to: receive and display mobile service information sent by the mobile service information server, where the mobile service information is determined by the mobile service information server according to location information of the mobile terminal at a current moment and location information of the mobile terminal within preset duration prior to the current moment.

Further, the sending unit 601 is further configured to: before the mobile service information sent by the mobile service information server is received, send a mobile service information obtaining request to the mobile service information server, where the mobile service information obtaining request carries a required amount of mobile service information.

Further, the sending unit 601 is configured to: report location information of the mobile terminal to the mobile service information server in real time when a location of the mobile terminal changes, or report location information of the mobile terminal within a designated time period to the mobile service information server when a preset condition is met, where the designated time period is a time period formed by a current moment and a moment at which location information of the mobile terminal is reported last time.

Functions of the foregoing units may be corresponding to corresponding processing steps in a process shown in any one of FIG. 2, FIG. 3, and FIG. 4, and details are not described herein again.

Embodiment 5

Figure 7:
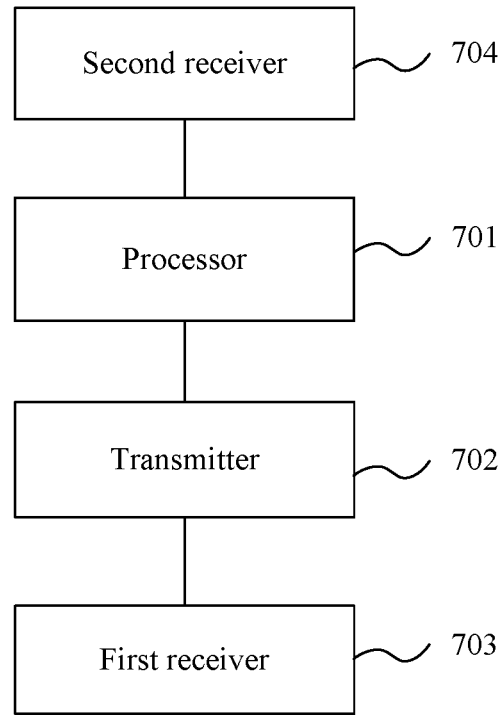
FIG. 7 is a schematic diagram of a structure of a mobile service information server according to Embodiment 5 of the present invention.

Based on a same inventive concept, according to the mobile service information display method provided in the foregoing embodiment of the present invention, correspondingly, this embodiment of the present invention further provides a mobile service information server, and a schematic diagram of a structure of the server is shown in FIG. 7. The server includes:

a processor 701, configured to determine mobile service information according to obtained location information of a mobile terminal at a current moment and obtained location information of the mobile terminal within preset duration prior to the current moment; and a transmitter 702, configured to send the determined mobile service information to the mobile terminal for display.

Further, the processor 701 is configured to: determine, according to the obtained location information of the mobile terminal at the current moment and the obtained location information of the mobile terminal within the preset duration prior to the current moment, a user attribute currently corresponding to the mobile terminal, and determine, based on a preset correspondence between a user attribute and mobile service information, mobile service information corresponding to the user attribute currently corresponding to the mobile terminal.

Further, the processor 701 is configured to: determine a location information characteristic possessed by the obtained location information of the mobile terminal at the current moment and the obtained location information of the mobile terminal within the preset duration prior to the current moment; and determine, according to a preset correspondence between a location information characteristic and a user attribute, that a user attribute corresponding to the possessed location information characteristic is the user attribute currently corresponding to the mobile terminal.

Further, the mobile service information server further includes a first receiver 703, configured to: before the determined mobile service information is sent to the mobile terminal for display, receive a mobile service information obtaining request sent by the mobile terminal, where the mobile service information obtaining request carries a required amount of mobile service information.

The processor 701 is configured to: when an amount of the determined mobile service information exceeds the required amount of mobile service information, select mobile service information in the required amount of mobile service information from the determined mobile service information according to a preset rule.

The transmitter 702 is configured to send the selected mobile service information to the mobile terminal for display.

Further, the mobile service information server further includes a second receiver 704, configured to: receive location information of the mobile terminal reported by the mobile terminal in real time when a location of the mobile terminal changes, or receive location information that is of the mobile terminal within a designated time period and reported by the mobile terminal when a preset condition is met, where the designated time period is a time period formed by a current moment and a moment at which the mobile terminal reports location information of the mobile terminal last time.

Functions of the foregoing parts may be corresponding to corresponding processing steps in a process shown in any one of FIG. 1, FIG. 3, and FIG. 4, and details are not described herein again.

Alternatively, in another embodiment of the present invention, the foregoing first receiver 703 and second receiver 704 may be one receiver.

Embodiment 6

Figure 8:
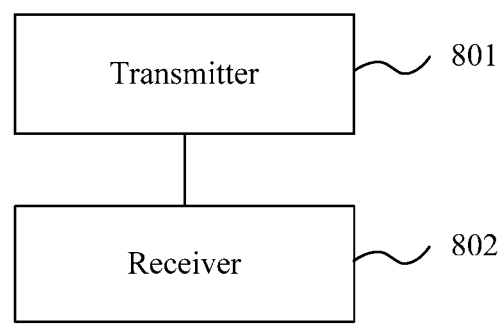
FIG. 8 is a schematic diagram of a structure of a mobile terminal according to Embodiment 6 of the present invention.

Based on a same inventive concept, according to the mobile service information display method provided in the foregoing embodiment of the present invention, correspondingly, this embodiment of the present invention further provides a mobile terminal, and a schematic diagram of a structure of the mobile terminal is shown in FIG. 8. The mobile terminal includes:

a transmitter 801, configured to report location information of the mobile terminal to a mobile service information server; and a receiver 802, configured to: receive and display mobile service information sent by the mobile service information server, where the mobile service information is determined by the mobile service information server according to location information of the mobile terminal at a current moment and location information of the mobile terminal within preset duration prior to the current moment.

Further, the transmitter 801 is further configured to: before the mobile service information sent by the mobile service information server is received, send a mobile service information obtaining request to the mobile service information server, where the mobile service information obtaining request carries a required amount of mobile service information.

Further, the transmitter 801 is configured to: report location information of the mobile terminal to the mobile service information server in real time when a location of the mobile terminal changes, or report location information of the mobile terminal within a designated time period to the mobile service information server when a preset condition is met, where the designated time period is a time period formed by a current moment and a moment at which location information of the mobile terminal is reported last time.

Functions of the foregoing parts may be corresponding to corresponding processing steps in a process shown in any one of FIG. 2, FIG. 3, and FIG. 4, and details are not described herein again.

Embodiment 7

Figure 9:
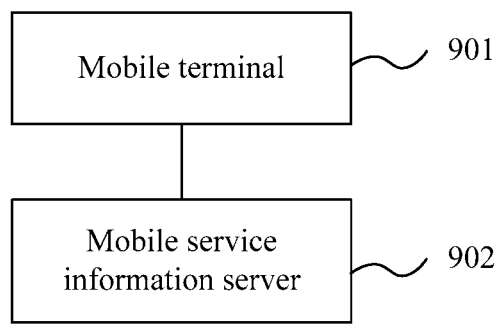
FIG. 9 is a schematic diagram of a structure of a mobile service information system according to Embodiment 7 of the present invention.

Based on a same inventive concept, according to the mobile service information display method provided in the foregoing embodiment of the present invention, correspondingly, this embodiment of the present invention further provides a mobile service information system, and a schematic diagram of a structure of the system is shown in FIG. 9. The system includes a mobile terminal 901 and a mobile service information server 902.

The mobile terminal 901 is configured to: report location information of the mobile terminal 901 to the mobile service information server 902, and receive and display mobile service information sent by the mobile service information server 902.

The mobile service information server 902 is configured to: receive the location information reported by the mobile terminal 901, determine mobile service information according to location information of the mobile terminal 901 at a current moment and location information of the mobile terminal 901 within preset duration prior to the current moment, and send the determined mobile service information to the mobile terminal 901.

Further, the mobile service information server 902 is configured to: determine, according to the location information of the mobile terminal 901 at the current moment and the location information of the mobile terminal 901 within the preset duration prior to the current moment, a user attribute currently corresponding to the mobile terminal 901, and determine, based on a preset correspondence between a user attribute and mobile service information, mobile service information corresponding to the user attribute currently corresponding to the mobile terminal 901.

Further, the mobile service information server 902 is configured to: determine a location information characteristic possessed by the obtained location information of the mobile terminal 901 at the current moment and the obtained location information of the mobile terminal 901 within the preset duration prior to the current moment; and determine, according to a preset correspondence between a location information characteristic and a user attribute, that a user attribute corresponding to the possessed location information characteristic is the user attribute currently corresponding to the mobile terminal 901.

Further, the mobile terminal 901 is further configured to: before receiving the mobile service information sent by the mobile service information server 902, send a mobile service information obtaining request to the mobile service information server 902, where the mobile service information obtaining request carries a required amount of mobile service information.

The mobile service information server 902 is further configured to: before sending the determined mobile service information to the mobile terminal 901 for display, receive the mobile service information obtaining request sent by the mobile terminal 901; when an amount of the determined mobile service information exceeds the required amount of mobile service information, select mobile service information in the required amount of mobile service information from the determined mobile service information according to a preset rule; and send the selected mobile service information to the mobile terminal 901 for display.

Further, the mobile terminal 901 is configured to report location information of the mobile terminal 901 to the mobile service information server 902 in real time when a location of the mobile terminal 901 changes, and the mobile service information server 902 is configured to receive the location information reported by the mobile terminal 901 in real time; or the mobile terminal 901 is configured to report location information of the mobile terminal 901 within a designated time period to the mobile service information server 902 when a preset condition is met, and the mobile service information server 902 is configured to receive the location information that is within the designated time period and reported by the mobile terminal 901, where the designated time period is a time period formed by a current moment and a moment at which the mobile terminal 901 reports location information of the mobile terminal 901 last time.

Functions of the foregoing mobile terminal 901 and mobile service information server 902 may be corresponding to corresponding processing steps in a process shown in any one of FIG. 1 to FIG. 4, and details are not described herein again.

In conclusion, by using the solutions provided in the embodiments of the present invention, mobile service information to be displayed on a mobile terminal is determined according to location information of the mobile terminal at a current moment and location information of the mobile terminal within preset duration prior to the current moment, which can improve properness of the determined mobile service information, effectively use resources of a mobile service information system, and improve usage experience of a user.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A mobile service information display method comprising:
   receiving, by a mobile service information server, a first location information of the mobile terminal at a current moment and a second location information of the mobile terminal within a preset duration prior to the current moment;
   determining, by the mobile service information server, a first mobile service information associated with the mobile terminal at the current moment based on the first and second location information of the mobile terminal,
   wherein the first mobile service information is different from a second mobile service information associated with the mobile terminal determined by the server based on the second location information; and
   sending, by the mobile service information server, the first mobile service information to the mobile terminal for display.

2. The method according to claim 1, wherein determining the first mobile service information associated with the mobile terminal at the current moment based on the first and second location information of the mobile terminal comprises:
   determining, by the mobile service information server, a first user attribute associated with the mobile terminal at the current moment according to the first and second location information of the mobile terminal; and
   determining, by the mobile service information server, the first mobile service information based on the first user attribute according to a preset correspondence between user attributes and mobile service information.

3. The method according to claim 2, wherein determining the first user attribute associated with the mobile terminal at the current moment according to the first and second location information of the mobile terminal comprises:
determining, by the mobile service information server, a first location information characteristic possessed by the first and the second location information of the mobile terminal; and
determining, by the mobile service information server, the first user attribute based on the first location information characteristic according to a preset correspondence between location information characteristics and user attributes associated with the mobile terminal.

4. The method according to claim 2, wherein the first user attribute is a business trip.

5. The method according to claim 4, wherein the first mobile service information is a ticket booking corresponding to the business trip.

6. The method according to claim 1, wherein before sending the first mobile service information to the mobile terminal for display, the method further comprises:
receiving, by the mobile service information server, a mobile service information obtaining request sent by the mobile terminal, wherein the mobile service information obtaining request carries a required amount of mobile service information;
wherein sending the first mobile service information to the mobile terminal for display comprises:
when an amount of the determined first mobile service information exceeds the required amount of mobile service information, selecting, by the mobile service information server, at least one of the determined first mobile service information in the required amount of mobile service information according to a preset rule, and sending, by the mobile service information server, the selected at least one of the determined first mobile service information to the mobile terminal for display.

7. The method according to claim 1, wherein the first location information of the mobile terminal at the current moment is obtained in the following manner:
receiving, by the mobile service information server, the first location information of the mobile terminal reported by the mobile terminal in real time when a location of the mobile terminal changes.

8. The method according to claim 1, wherein the first location information of the mobile terminal at the current moment is obtained in the following manner:
receiving, by the mobile service information server, the first location information of the mobile terminal reported by the mobile terminal periodically.

9. The method according to claim 1, wherein the method further comprising deleting, by the mobile service information server, the second location information of the mobile terminal after sending the first mobile service information.

10. A mobile service information server comprising a processor and a transceiver coupled with the processor;
wherein the transceiver is configured to cooperate with the processor for receiving a first location information of a mobile terminal at a current moment and a second location information of the mobile terminal within a preset duration prior to the current moment;
wherein the processor is configured for determining a first mobile service information associated with the mobile terminal at the current moment based on the first and second location information of the mobile terminal,
wherein the first mobile service information is different from a second mobile service information associated with the mobile terminal and determined by the server based on the second location information; and
wherein the transceiver is further configured to cooperate with the processor for sending the first mobile service information to the mobile terminal for display.

11. The server according to claim 10, wherein when determining the first mobile service information associated with the mobile terminal at the current moment based on the first and second location information of the mobile terminal, the processor is further configured for:
determining a first user attribute associated with the mobile terminal at the current moment according to the first and second location information of the mobile terminal; and
determining the first mobile service information based on the first user attribute according to a preset correspondence between user attributes and mobile service information.

12. The server according to claim 11, wherein when determining the first user attribute associated with the mobile terminal at the current moment according to the first and second location information of the mobile terminal, the processor is configured for:
determining a first location information characteristic possessed by the first and the second location information of the mobile terminal; and
determining the first user attribute based on the first location information characteristic according to a preset correspondence between location information characteristics and user attributes associated with the mobile terminal.

13. The server according to claim 11, wherein the first user attribute is a business trip.

14. The server according to claim 13, wherein the first mobile service information is a ticket booking corresponding to the business trip.

15. The server according to claim 10, wherein before sending the first mobile service information to the mobile terminal for display, the transceiver is further configured to cooperate with the processor for receiving a mobile service information obtaining request sent by the mobile terminal, wherein the mobile service information obtaining request carries a required amount of mobile service information;
the processor is further configured for, when an amount of the determined first mobile service information exceeds the required amount of mobile service information, selecting at least one of the determined first mobile service information in the required amount of mobile service information according to a preset rule; and
the transceiver is further configured to cooperate with the processor for sending the selected at least one of the determined first mobile service information to the mobile terminal for display.

16. The server according to claim 10, wherein when receiving the first location information of the mobile terminal at the current moment,
the transceiver is further configured to cooperate with the processor for receiving the first location information of the mobile terminal reported by the mobile terminal in real time when a location of the mobile terminal changes.

17. The server according to claim 10, wherein when receiving the first location information of the mobile terminal at the current moment, the transceiver is configured to cooperate with the processor for periodically receiving the first location information of the mobile terminal reported by the mobile terminal.

18. The server according to claim 10, wherein the processor is further configured for deleting the second location information of the mobile terminal after sending the first mobile service information.

19. A mobile service information system comprising a mobile terminal and a mobile service information server;
  wherein the mobile terminal is configured for reporting a first location information of the mobile terminal at a current moment and a second location information of the mobile terminal within a preset duration prior to the current moment to the server; and
  wherein the server is configured for
    receiving the first and second location information of the mobile terminal;
    determining a first mobile service information associated with the mobile terminal at the current moment based on the first and second location information of the mobile terminal, wherein the first mobile service information is different from a second mobile service information associated with the mobile terminal determined by the server based on the second location information; and
    sending the first mobile service information to the first mobile terminal for display.

20. The system according to claim 19, wherein the server is further configured for deleting the second location information of the mobile terminal after sending the first mobile service information.

* * * * *